May 28, 1968     D. E. MacLEOD     3,385,349
CONTROL ARRANGEMENT FOR AN AIR CONDITIONING SYSTEM
Filed March 1, 1966
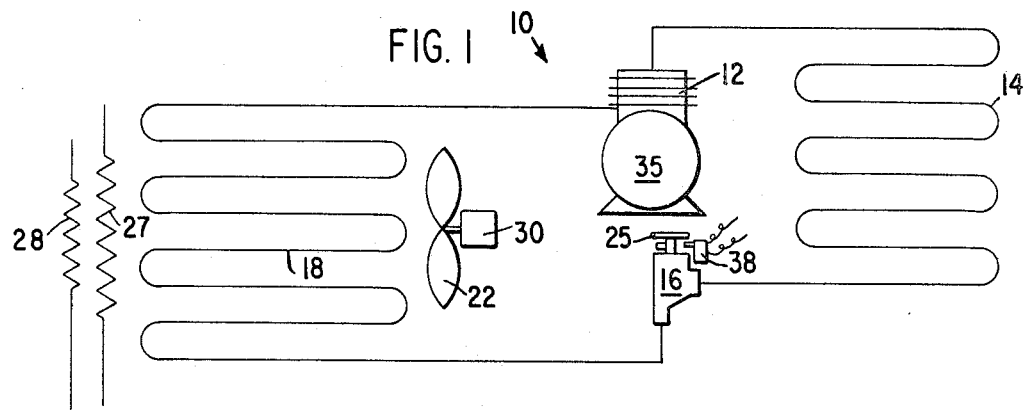
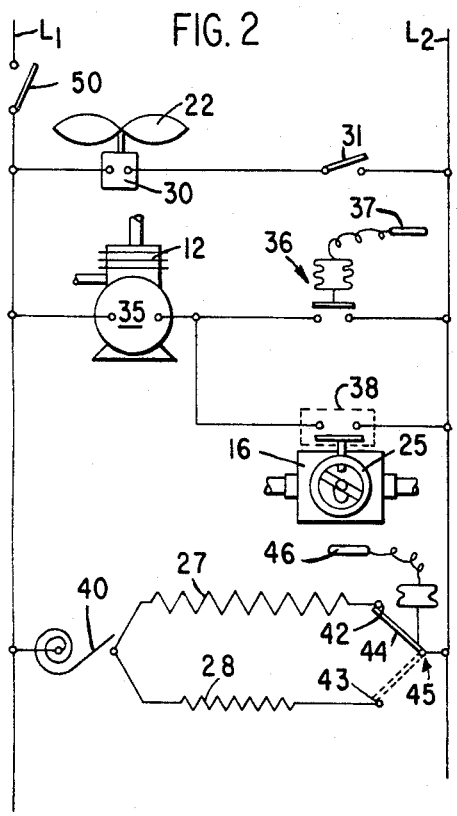
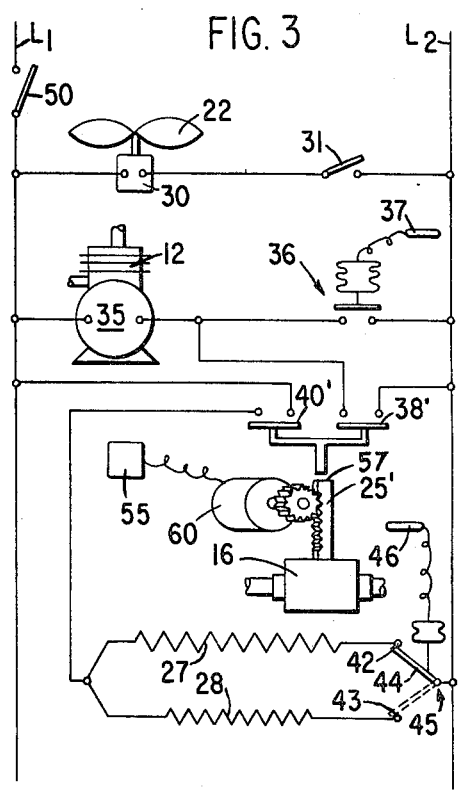
INVENTOR.
DAVID E. MAC LEOD.
BY
ATTORNEY.

United States Patent Office 3,385,349
Patented May 28, 1968

3,385,349
CONTROL ARRANGEMENT FOR AN AIR
CONDITIONING SYSTEM
David E. MacLeod, Syracuse, N.Y., assignor to Carrier
Corporation, Syracuse, N.Y., a corporation of Delaware
Filed Mar. 1, 1966, Ser. No. 530,864
8 Claims. (Cl. 165—21)

ABSTRACT OF THE DISCLOSURE

Air conditioning apparatus having a control arrangement which actuates the apparatus for cooling and, when dehumidification is required, nullifies the cooling control to permit the apparatus to operate for dehumidification purposes and provides reheat for the dehumidified air in accordance with temperature conditions of the area being treated.

---

This invention relates to an air conditioning apparatus and, more particularly, to an air conditioning apparatus adapted to cool and dehumidify.

While air conditioning apparatuses are, in most instances, considered to be devices whose principal, if not sole, function is to cool, in the performance of the cooling process the air conditioning apparatus removes moisture from or dehumidifies the air. The usual air conditioning apparatus ceases to dehumidify when the room dry-bulb temperature is satisfied. On cool but very humid days, therefore, the machine may not run, even though dehumidification is desired, because the thermostat senses a satisfactorily low dry-bulb temperature. Running the unit to obtain further dehumidification after the room temperature has been satisfied results in uncomfortably cool conditions.

To dehumidify without overcooling, the chilled air may be reheated before discharge into the area conditioned. Even with reheat, however, the dehumidification potential of the air conditioning apparatus must be compromised to accommodate situations where sensible cooling only is the principal demand and dehumidification is of secondary importance. In this situation, reheating is not desired.

It is a principal object of the present invention to provide an improved air conditioning and dehumidifying apparatus.

It is an object of the present invention to provide an air conditioning apparatus arranged to provide maximum dehumidification without objectionable overcooling.

It is a further object of the present invention to provide an air conditioning apparatus incorporating an expansion valve adjustable to regulate evaporator coil temperature and control dehumidification of the unit with reheating means for modulating temperature conditions of the dehumidified air.

It is an object of the present invention to provide an air conditioning and dehumidifying unit incorporating a control arrangement effective, during dehumidification, to nullify the unit cooling control and reheat the cooled and dehumidified air in accordance with temperature conditions of the area conditioned.

This invention relates to an air conditioning apparatus adapted to cool and dehumidify comprising in combination means forming a closed refrigeration circuit including a compressor, an outdoor coil, an expansion valve of the type adapted to maintain a constant pressure on the downstream side thereof, and an indoor coil downstream of the expansion valve; fan means for moving a stream of air over the indoor coil; means operable at a predetermined temperature condition of the area being conditioned to actuate the compressor whereby the apparatus cools and dehumidifies, and means for changing the pressure setting of the expansion valve to vary pressure and temperature conditions of the indoor coil and regulate the cooling and dehumidification capacity of the apparatus.

Other objects and advantages of the present invention will be readily perceived from the ensuing description and drawings in which:

FIGURE 1 is a schematic view showing an air conditioning apparatus incorporating the dehumidification arrangement of the present invention;

FIGURE 2 is a wiring diagram showing the control arrangement for the air conditioning apparatus in FIGURE 1; and FIGURE 3 is a schematic view showing a modified dehumidification arrangement for the air conditioning apparatus of FIGURE 1.

Referring to FIGURE 1 of the drawing, there is shown an air conditioning apparatus 10 adapted to cool and dehumidify. Air conditioning apparatus 10 includes compressor 12, outdoor heat exchange coil or condenser 14, automatic expansion valve 16, and indoor heat exchange coil or evaporator 18 interconnected in a closed refrigeration circuit. Fan 22 brings air to be conditioned into heat exchange relation with evaporator 18, the conditioned air thereafter being discharged into the area being conditioned, for example a room.

During operation of air conditioning apparatus 10, relatively hot, high pressure gaseous refrigerant from compressor 12 flows into outdoor coil 14 wherein the refrigerant is condensed. Condensed refrigerant from outdoor coil 14 passes to pressure reducing expansion valve 16 which serves to feed reduced pressure refrigerant to indoor coil 18. There, the refrigerant absorbs heat from the relatively warm air stream generated by fan 22, the vaporized refrigerant returning from coil 18 to compressor 12. The heat extracted from the air stream results in cooled and dehumidified air which thereafter flows into the area being conditioned.

The degree of dehumidification effected by air conditioning apparatus 10 is dependent upon the degree in which the air stream generated by fan 22 is cooled in passing over coil 18. Generally, the greater the degree of sensible cooling, the greater the dehumidification. The operating temperature of indoor coil 18 depends upon the pressure setting of expansion valve 16.

Expansion valve 16 comprises any commercially available automatic constant pressure type expansion valve. Valves of this type serve to maintain, within the design limits of the valve itself, a preset fluid pressure downstream thereof. During normal cooling operation of the air conditioning apparatus 10, valve 16 maintains a preset pressure, and, correspondingly, a preset temperature, for example 45° F., in indoor coil 18. When extra dehumidification is desired, movable operator 25 of valve 16 is actuated to adjust valve 16 to maintain a lower pressure condition, and correspondingly, a lower temperature, for example 35° F., in indoor coil 18. The amount of moisture extracted from the air stream passing through indoor coil 18 at the lower coil temperature is greater than that extracted at the normal coil temperature.

Since the temperature of the air stream leaving the indoor coil 18 at the lower pressure setting of expansion valve 16 is relatively low, resistor type auxiliary heaters 27, 28 are arranged downstream of coil 18. Heaters 27, 28, when energized, warm or heat the air prior to discharge of the air into the area conditioned. Heater 27 has a heating capacity greater than the cooling capacity of the air conditioning apparatus 10, while heater 28 has a heating capacity less than the cooling capacity of the air conditioning apparatus 10.

Referring to FIGURE 2 of the drawing, motor 30 of fan 22 is series connected with manually operated switch 31 across power leads $L_1$ and $L_2$. Leads $L_1$ and $L_2$ connect to a suitable source of alternating current power. A three-phase system of alternating current power may be used if the control circuit is suitably modified. Motor 35 of compressor 12 is series connected with cooling demand responsive switch 36 across leads $L_1$ and $L_2$. The sensing element of switch 36, bulb 37, may be arranged in the return air stream. Switch 38 parallels switch 36. Switch 38 is closed when operator 25 of expansion valve 16 is moved to adjust expansion valve 16 to the lower evaporator coil pressure.

One side of heaters 27, 28 is connected through temperature responsive switch 40 to lead $L_1$. The temperature responsive control element of switch 40 is disposed in heat exchange relation with indoor coil 18. Switch 40 closes when temperature conditions of coil 18 correspond to the lower pressure setting of expansion valve 16 and opens when temperature conditions of coil 18 correspond to the normal or higher pressure setting of expansion valve 16.

The opposite side of heaters 27, 28 is connected to contacts 42, 43, respectively, of a two-position temperature responsive switch 45. Switch arm 44 of switch 45 is connected to lead $L_2$. The temperature responsive control element 46 of switch 45 is suitably disposed to sense temperature conditions of the area conditioned, for example, in the return air stream.

With switch 50 closed, closure of switch 31 completes an energizing circuit to motor 30 of fan 22. Assuming expansion valve 16 to be adjusted for normal cooling operation, on a demand for cooling, switch 36 closes to complete an energizing circuit to motor 35 of compressor 12. The air conditioning unit 10 accordingly operates to cool and, to a limited extent, dehumidify the air stream discharged into the area conditioned by fan 22.

Switch 40, which senses temperature conditions of indoor coil 18, is open. Accordingly heaters 27, 28 are inoperative. Upon satisfaction of the cooling demand, switch 36 opens to interrupt the energizing circuit to motor 35 and stop compressor 12.

Should additional dehumidification be required, operator 25 of expansion valve 16 is moved to change the pressure setting of automatic expansion valve 16. Expansion valve 16 now maintains relatively lower pressures in coil 18. Movement of operator 25 of expansion valve 16 closes switch 38 to complete an energizing circuit to motor 35 of compressor 12. Switch 40, responding to the lower temperature now prevailing within indoor coil 18, closes to complete an energizing circuit to either heater 27 or 28 depending upon the position of arm 44 of switch 45.

If heater 27, whose heating capacity is slightly greater than the cooling capacity of the air conditioning unit, is energized through closure of switch contact 42 by switch arm 44, the air conditioning unit 10 slowly warms the area being conditioned. When the temperature of the area conditioned becomes too high, temperature responsive switch 45 moves switch arm 44 to open contact 42 and close contact 43 thereby deenergizing heater 27 and energizing heater 28. Since the heating capacity of heater 28 is less than the cooling capacity of the air conditioning unit 10, the unit 10 cools. When the temperature becomes too low, temperature responsive switch 45 moves switch arm 44 to close contact 42 and energize heater 27. Contact 43 is opened and heater 28 deenergized.

The air conditioning unit 10 operates to provide maximum dehumidification until expansion valve 16 is manually reverted to the normal cooling cycle pressure setting. Operator 25, when moved to return valve 16 to the normal pressure setting, opens switch 38 and operational control of compressor 12 is returned to the cooling demand responsive switch 36.

It is understood that fan 22 may be controlled automatically rather than manually as, for example, through cooling demand responsive switch 36. Additionally, switch 40, which closes at the occurrence of a relatively low temperature condition in coil 18 following adjustment of expansion valve 16 to the lower pressure setting, may instead be closed by operator 25 when valve 16 is adjusted to the lower pressure setting.

While alternately energizable resistors 27, 28 are disclosed, one having a heating capacity greater than the cooling capacity of apparatus 10 and the other a heating capacity less than the cooling capacity of apparatus 10, a single variable resistor may be utilized in place of resistors 27, 28. In that circumstance, the control arm of the variable resistor is adjusted in response to temperature conditions of the area conditioned by means of control element 46.

In the arrangement shown in FIGURE 3 of the drawing, where like numerals refer to like parts changes in the pressure setting of automatic expansion valve 16 are effected automatically, within the design limits of valve 16, in response to changes in the humidity of the area conditioned. Humidistate 55 regulates the position of operator 25' of valve 16, as by means of step-type positioning motor 60, to vary the pressure setting of expansion valve 16 in response to changes in the humidity conditions of the area conditioned. If the humidity within the area conditioned is above that desired, operator 25' of valve 16 is, in the exemplary showing of FIGURE 3, moved upwardly to reduce the pressure setting of valve 16 and, correspondingly, temperature conditions of indoor coil 18, whereby the dehumidification ability of apparatus 10 is increased. As the humidity approaches that desired, valve operator 25' is moved downwardly to bring the pressure setting of valve 16 back to the pressure setting for normal cooling operation of the air conditioning apparatus 10.

In the FIGURE 3 arrangement, operator 25' of valve 16 has a cam-like projection 57 thereon engageable, on upward movement of valve operator 25' with switches 38', 40', to close both switch 38' and switch 40'. Closure of switch 38' completes an energizing circuit to compressor motor 35 bypassing cooling demand responsive switch 36, while switch 40' completes an energizing circuit to either resistor 27 or 28 depending upon the position of switch arm 44 to provide controlled heating of the cooled and dehumidified air, as explained heretofore.

While I have described a preferred embodiment of this invention, it will be understood that the invention is not limited thereto since it may be otherwise embodied within the scope of the following claims.

I claim:

1. In an air conditioning apparatus adapted to cool and dehumidify, the combination of means forming a closed refrigeration circuit including a compressor, an outdoor coil, an expansion valve of the type adapted to maintain a constant pressure on the downstream side thereof, said valve being adjustable to permit change in its pressure setting, and an indoor coil downstream of said expansion valve; fan means for moving a stream of air over said indoor coil; means responsive to a predetermined temperature condition of the area being conditioned to actuate said compressor whereby said apparatus cools and dehumidifies, means for changing the pressure setting of said expansion valve to vary pressure and temperature conditions of said indoor coil and regulate the cooling and dehumidification capacity of said apparatus, means for heating the air stream after its passage over said indoor coil, means arranged in parallel with said temperature responsive means to actuate said compressor when said pressure changing means are actuated, and means responding to a predetermined increase in the dehumidification capacity of said apparatus to actuate said heating means whereby said apparatus dehumidifies and tempers said air stream.

2. An air conditioning apparatus according to claim 1 in which said expansion valve pressure changing means includes movable adjusting mechanism for said expansion valve, said expansion valve being adapted following preset adjustment movement of said mechanism to maintain a relatively low pressure condition in said indoor coil whereby said apparatus provides maximum dehumidification.

3. An air conditioning apparatus according to claim 2 in which said control means includes a switch responding to preset adjusting of said expansion valve mechanism to complete an energizing circuit to said compressor.

4. An air conditioning apparatus according to claim 2 in which said expansion valve pressure changing means includes humidity responsive means for moving said expansion valve mechanism in response to humidity conditions of the area being conditioned.

5. An air conditioning apparatus according to claim 4 in which said control means includes switch means adapted upon movement of said expansion valve mechanism by said humidity responsive means to complete energizing circuits to said compressor, and said heating means.

6. In an air conditioning apparatus according to claim 1 in which said control means includes a temperature responsive actuator for sensing indoor coil temperatures effective at a predetermined indoor coil temperature to actuate said heating means.

7. An air conditioning apparatus according to claim 1 in which said control means includes a temperature responsive device for varying the heat output of said heating means in response to temperature conditions of the area being conditioned.

8. An air conditioning apparatus according to claim 7 in which said heating means includes first and second resistor type heat devices, the heating capacity of said first resistor being greater than the cooling capacity of said apparatus, the heating capacity of said second resistor being less than the cooling capacity of said apparatus; an energizing circuit for each of said first and second resistors, said control means temperature responsive device being adapted to complete the energizing circuit to said first resistor at a relatively low temperature of the area conditioned whereby said apparatus dehumidifies and warms said area, said control means temperature responsive device being adapted to interrupt said first resistor energizing circuit and complete the energizing circuit to said second resistor at a relatively high temperature of the area conditioned whereby said apparatus cools and dehumidifies said area.

References Cited

UNITED STATES PATENTS

| | | | |
|---|---|---|---|
| 1,378,026 | 5/1921 | Hasen | 62—222 X |
| 2,400,329 | 5/1946 | Alexander | 165—21 X |
| 2,517,499 | 8/1950 | McGrath | 62—93 |
| 3,155,156 | 11/1964 | Kyle | 165—30 X |
| 3,183,962 | 5/1965 | Steinhagen et al. | 165—30 X |
| 3,264,840 | 8/1966 | Harnish | 62—175 |

ROBERT A. O'LEARY, *Primary Examiner.*

M. A. ANTONAKAS, *Assistant Examiner.*

UNITED STATES PATENT OFFICE

CERTIFICATE OF CORRECTION

Patent No. 3,385,349

May 28, 1968

David E. MacLeod

It is certified that error appears in the above identified patent and that said Letters Patent are hereby corrected as shown below:

Column 4, line 21, "Humidistate" should read -- Humidista --. Column 5, line 9, after "adjusting" insert -- movement --.

Signed and sealed this 11th day of November 1969.

(SEAL)
Attest:

Edward M. Fletcher, Jr.
Attesting Officer

WILLIAM E. SCHUYLER, JR.
Commissioner of Patents